March 31, 1970  J. F. MORSE  3,503,275
SYSTEM FOR MOTION TRANSFER BY BALANCED CABLES
Filed Oct. 26, 1967  7 Sheets-Sheet 1

INVENTOR
JOHN F. MORSE
BY Hamilton & Cook
ATTORNEYS

March 31, 1970 J. F. MORSE 3,503,275
SYSTEM FOR MOTION TRANSFER BY BALANCED CABLES
Filed Oct. 26, 1967 7 Sheets-Sheet 2
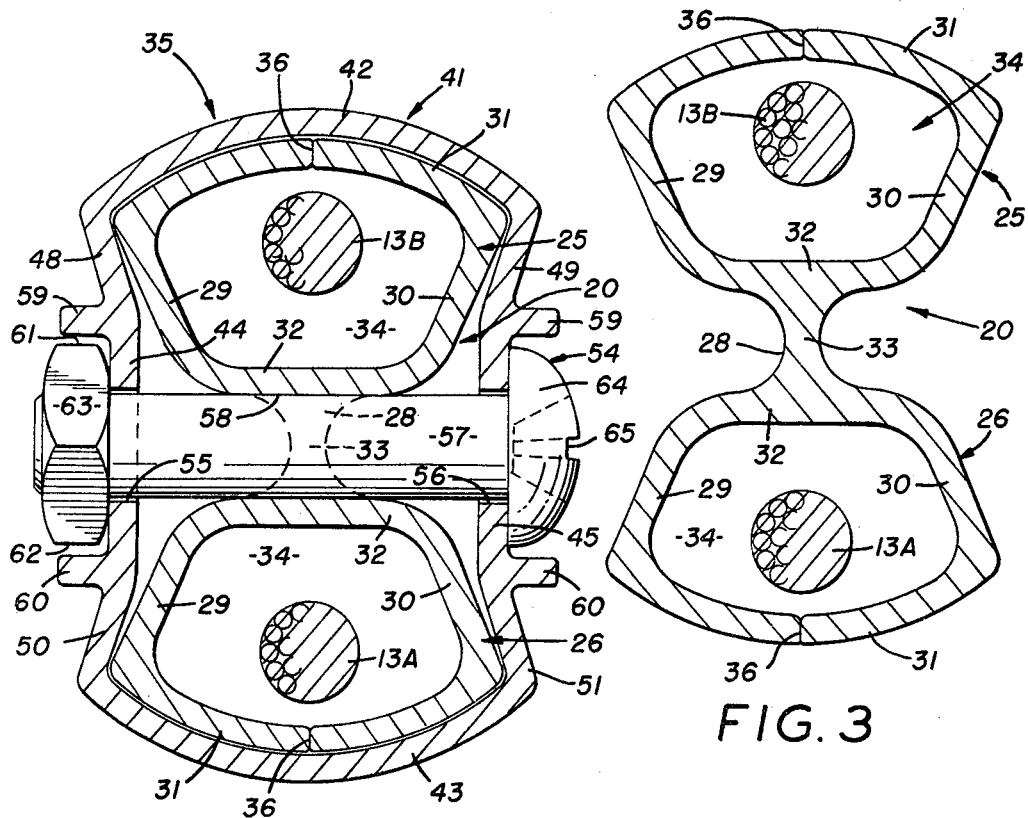
FIG. 5
FIG. 3
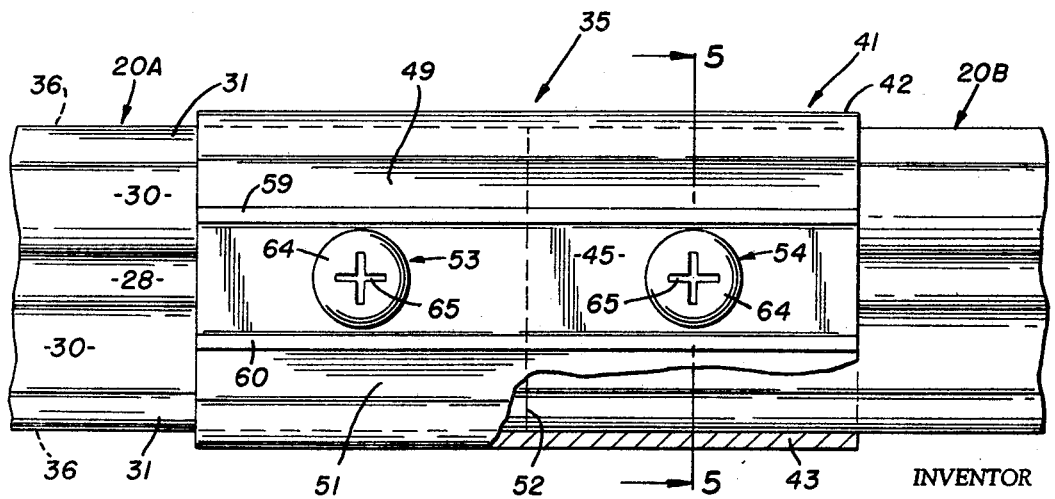
FIG. 4
INVENTOR
JOHN F. MORSE
BY Hamilton & Cook
ATTORNEYS INVENTOR
JOHN F. MORSE
BY Hamilton & Cook
ATTORNEYS March 31, 1970          J. F. MORSE          3,503,275
SYSTEM FOR MOTION TRANSFER BY BALANCED CABLES
Filed Oct. 26, 1967                    7 Sheets-Sheet 4
FIG. 7
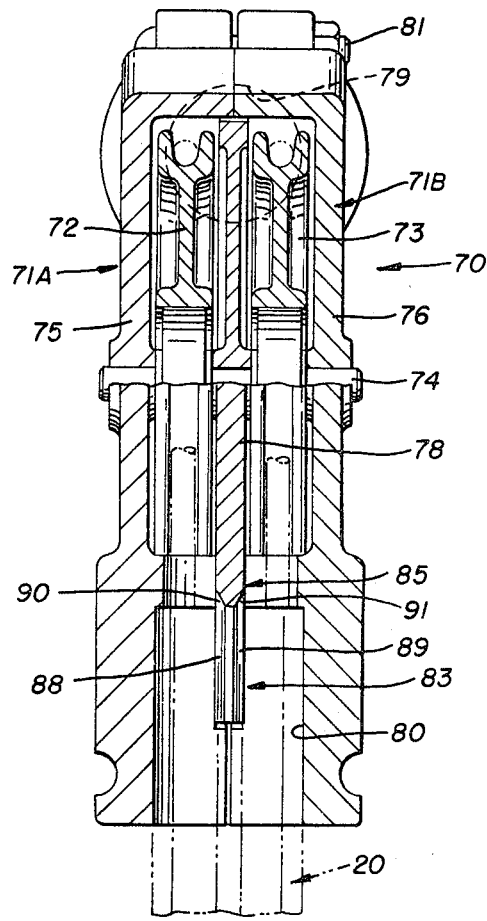
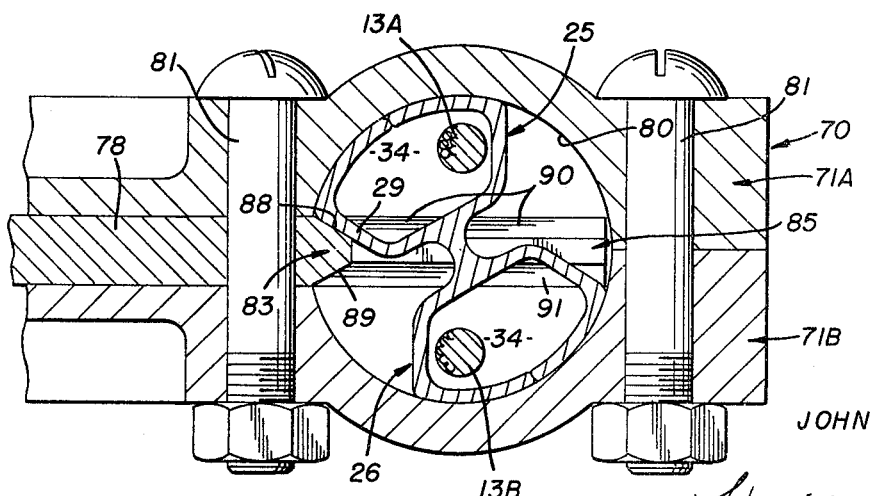
FIG. 9
INVENTOR
JOHN F. MORSE
BY Hamilton & Cook
ATTORNEYS

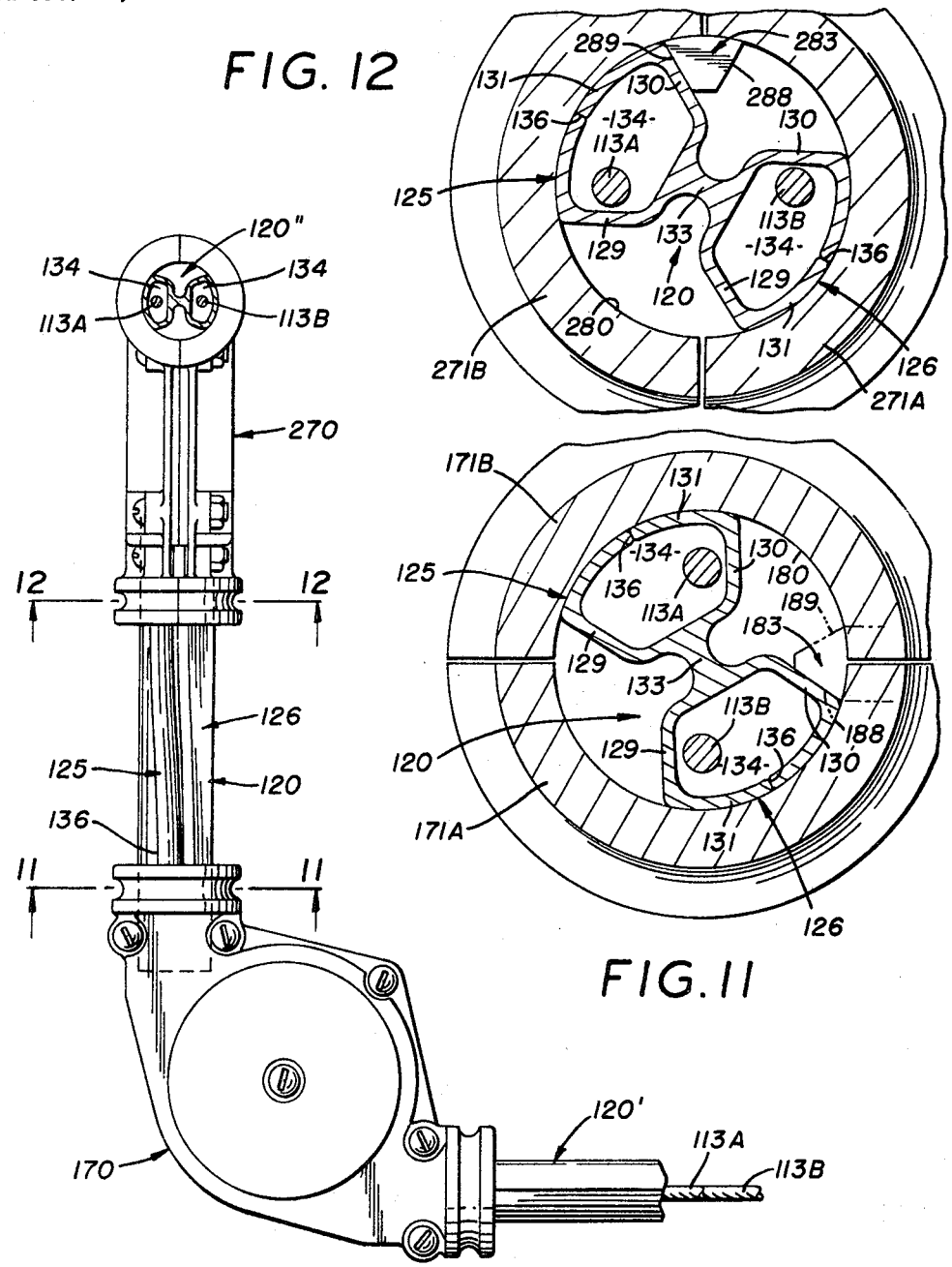

March 31, 1970 J. F. MORSE 3,503,275
SYSTEM FOR MOTION TRANSFER BY BALANCED CABLES
Filed Oct. 26, 1967 7 Sheets-Sheet 6
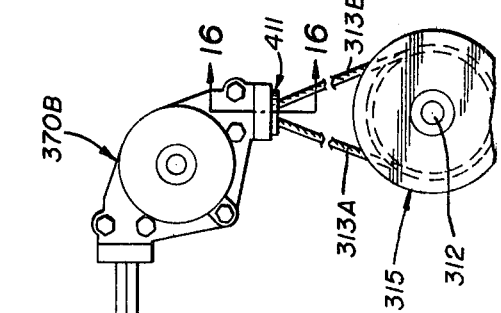
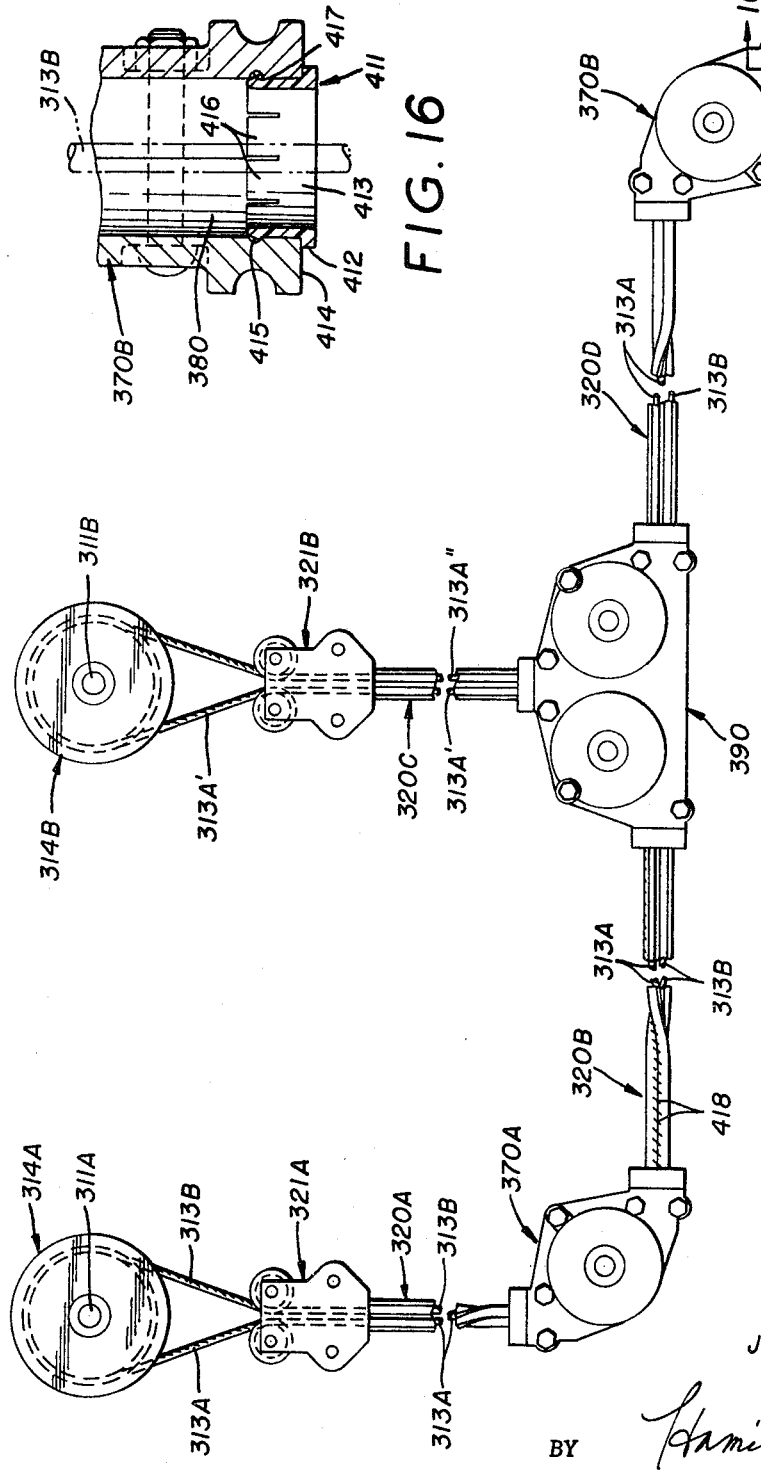
INVENTOR
JOHN F. MORSE
BY Hamilton & Cook
ATTORNEYS

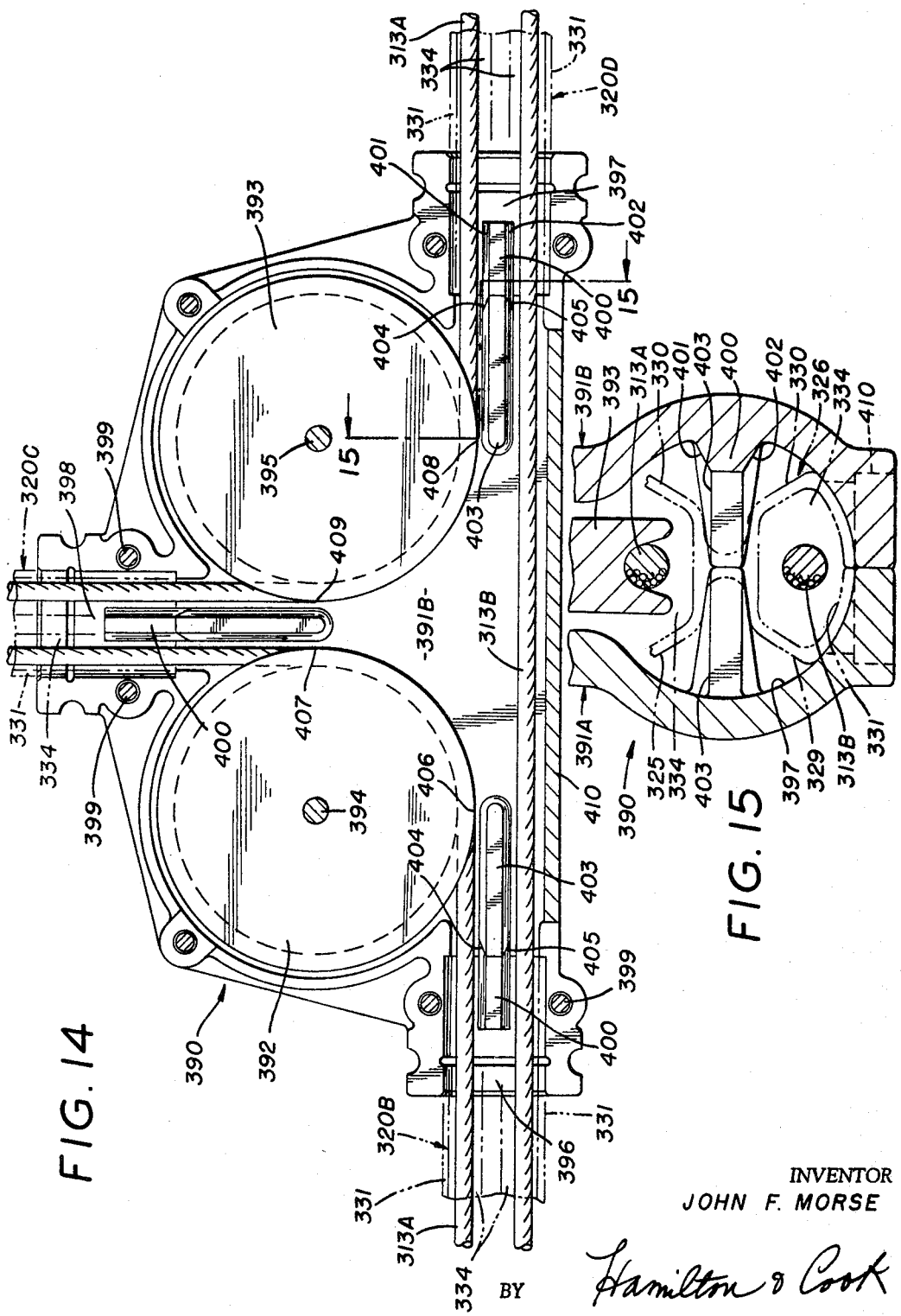

United States Patent Office 3,503,275
Patented Mar. 31, 1970

3,503,275
SYSTEM FOR MOTION TRANSFER BY BALANCED CABLES
John F. Morse, Hudson, Ohio, assignor, by mesne assignments, to North American Rockwell Corporation, Pittsburgh, Pa., a corporation of Delaware
Filed Oct. 26, 1967, Ser. No. 678,332
Int. Cl. F16c 1/10; F16l 9/16, 9/00
U.S. Cl. 74—501  21 Claims

ABSTRACT OF THE DISCLOSURE

A system for transferring motion between remote locations by balanced control cables. The system employs a unique conduit of unitary construction with two, distinct, opposed ducts. Each duct and the chamber therein presents generally a cross-sectional shape of a truncated sector. The truncating chord walls of opposed ducts are joined by a transverse web. The included arcuate wall between the side walls of each duct is cleft longitudinally of the conduit. The conduit thus formed has excellent columnar and beam strength but limited torsional strength so that the conduit may be torsionally twisted, and set, to effect a selected change in the plane of the cables passing through the ducts without distortion of the chambers within each duct and therefore without restricting the movement of the cables therein. Unique couplers are provided for joining lengths of the conduit together, also without restriction, and special elbows are provided through which the cables can be reeved from either conduit with assured entrance into the appropriate chambers of the other conduit attached to such elbow. Lateral take-offs are also provided to permit tributary connections in the system by accommodating a departing and return run of one of the cables with respect to the direction in which the other cable is continued.

BACKGROUND OF THE INVENTION

The present invention relates generally to systems for transferring motion between remote locations and particularly to a balanced cable system.

Balanced cable systems have their genesis in antiquity. For example, a system of ropes, or cables, over puleys for the remote control of a ship's rudder is almost as old as ships themselves. When applied to a ship's steering mechanism, a "balanced" system has traditionally comprised a wheel and shaft with a rope driving drum at the steering station to provide the required movement of the two ropes leading from the driving drum to the driven component. The two ropes are attached to the driving and driven components in opposition. This opposition of the connection is necessary inasmuch as the ropes, or cables, transmitting the motion must form a closed system because of their inability to relay mechanical motion by other than tensile stresses. The appelation "balanced" is therefore quite appropriate.

The historically conventional cable and pulley variety of "balanced" control systems had to be especially designed and built for each installation. This increased the cost. Moreover, the multiplicity of individually mounted pulleys and long lengths of exposed cable not only subjected the system to undue wear and abrasion but also imparted a very spongy operation since the pulleys were able to move and flex independently.

The afore-described difficulties were largely overcome by the advent of a system in which the pulleys are fixedly mounted in elbows and the elbows interconnected by pipe-like, cylindrical conduit. Such a system is fully disclosed in my prior United States patent, No. 2,737,822, and after proper installation, operates quite satisfactorily.

A balanced cable and pulley system, as taught by my aforesaid patent, No. 2,737,822, embodies at least two strands of cable running side by side through the conduit and reeved over adjacent, coaxial pulleys at each elbow. When meticulously installed there is no interference between the two cables. However, extreme care must be taken so that there is no "cable crossover" in the system. Cable crossover, or twisting of the cables one onto the other, is easily occasioned when threading such a system, particularly if it follows an arduously angular course—even a mind that lucidly envisions spacial relations can become lost after reeving the cable through the pulleys in just a limited number of elbows.

The occasion for cable crossover is further increased during maintenance and repair procedures when tension on the cables is loosened. At such times it is very easy for the cables to be retensioned on the wrong pulley in conventional systems.

It is quite apparent to those skilled in this art that any cable crossover will result not only in chafing between the two cables but will also impart an undesirable frictional drag to the system.

SUMMARY OF THE INVENTION

It is therefore a primary object of the present invention to provide a system for the transmission of motion in which the conduit construction precludes cable crossover.

It is another object of the present invention to provide a system, as above, in which the said conduit provides excellent columnar and beam strength to maintain the compressive rigidity required in such a system to withstand the compressive loads imparted thereto by tensioned cables.

It is still another object of the present invention to provide a system, as above, in which the said conduit has a distinct chamber for each cable and said conduit can be readily twisted, upon the application of modest torsional force, about its longitudinal axis to maintain a selective degree of set and yet not distort the cross-section of the chambers within the conduit.

It is a further object of the present invention to provide a system, as above, in which lengths of the said conduit can be readily coupled with positive chamber alignment and without the necessity of coupling means entering said chambers.

It is an even further object of the present invention to provide a system, as above, in which lateral take-offs permit a change in the direction of just one of said balanced cables in order to permit tributary connections to the system.

It is a still further object of the present invention to provide a system, as above, in which the elbow construction permits a controlled range of rotary displacement of the elbow with respect to the conduits connected thereto and yet maintains the cable strands in their proper paths across the proper pulley to pass from either chamber in either conduit to the appropriate chamber in the other conduit.

These and other objects of the present invention, as well as the advantages thereof over existing and prior art forms, will be apparent in view of the following detailed description of the attached drawings and are accomplished by means hereinafter described and claimed.

In general, a system embodying the concept of the present invention employs a unique conduit. The conduit is comprised of opposed ducts each having generally the cross-sectional shape of a truncated sector.

The opposed ducts are integrally joined by a web and the outer wall bounding a longitudinal chamber within each of the opposed ducts is cleft longitudinally of the conduit along its most remote spacial separation from the other duct of said conduit in order to permit torsional bending of the conduit. The cleft is therefore generally located at the apogee of the arcuate wall with respect to the chord wall by which the sector is truncated.

A specially constructed coupler is provided for joining longitudinally abutting sections of the conduit. Opposed walls of the coupler matingly engage the arcuate walls of the conduit, and the transverse or flank, walls of the coupler accept screws which pass through the web of the conduit. Tightening of these screws causes the arcuate walls of the coupler to move firmly against the corresponding arcuate walls of the conduit to effect a rigid connection between the sections of the conduit so joined.

Compatible with the unique conduit are elbows for preselected degrees of bend. The elbows include a unique key plate that presents index keys for limiting rotary displacement of the elbow with respect to the conduits joined thereto. The key plate also has guide flanges to prevent cable crossover through the elbow.

Lateral take-offs are provided that permit directing the run of one of said balanced cables laterally with respect to the run of the other to a location remote of the primary driving or driven station for a secondary driving or driven station. These take-offs are likewise consonant with the system and provide index keys and guide flanges to assure the maintenance of cable separation therethrough not only under operating conditions but also during initial installation and subsequent repairs or adjustments.

One preferred embodiment of the system with one form for the conduit, conduit couplers, elbows and take-offs being shown by way of example in the accompanying drawings and is described in detail without attempting to show all of the various forms and modifications in which the invention might be embodied; the invention being measured by the appended claims and not by the details of the specification.

DESCRIPTION OF THE DRAWINGS

FIG. 3 is an enlarged section taken substantially on line 3—3 of FIG. 1 depicting the improved conduit in cross-section;

FIG. 4 is an enlarged area of FIG. 1 depicting two sections of the conduit joined by an improved coupler shown in side elevation and partly broken away;

FIG. 5 is a further enlarged cross-section taken substantially on line 5—5 of FIG. 4;

FIG. 7 is a further cross-section taken substantially on line 7—7 of FIG. 6;

FIG. 9 is a view similar to FIG. 8 depicting the maximum rotational displacement, in one direction, of the elbow with respect to one of the conduits received therein;

FIG. 10 is a schematic side elevation depicting a typical arrangement of two 90° elbows and a short length of conduit to accomplish a 90° change of plane in the run of both cables;

FIG. 11 is an enlarged cross-section taken substantially on line 11—11 of FIG. 10;

FIG. 12 is an enlarged cross-section taken substantially on line 12—12 of FIG. 10;

FIG. 13 is a schematic side elevation of a system embodying the concept of the present invention in which a lateral take-off is employed;

FIG. 14 is an enlarged longitudinal section through the lateral take-off depicted in FIG. 13 depicting one of the opposed housing sections and the two pulleys in side elevation;

FIG. 15 is a partial section taken substantially on line 15—15 of FIG. 14; and

FIG. 16 is an enlarged cross-section through the socket of an elbow taken substantially on line 16—16 of FIG. 13.

DETAILED DESCRIPTION OF THE PREFERRED EMBODIMENTS

Figure 1:
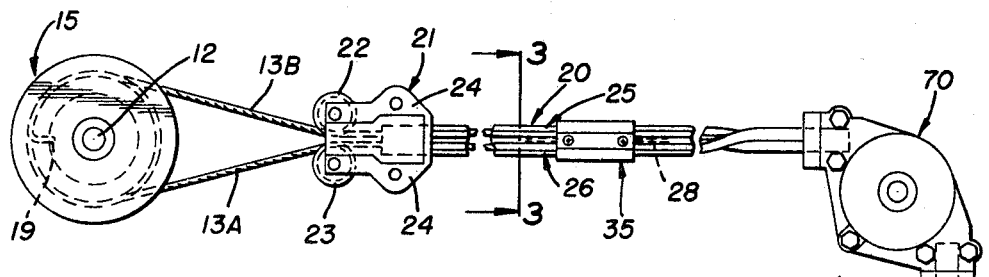
FIG. 1 is a schematic side elevation of a balanced system for transmitting motion embodying the concept of the present invention.
Figure 2:
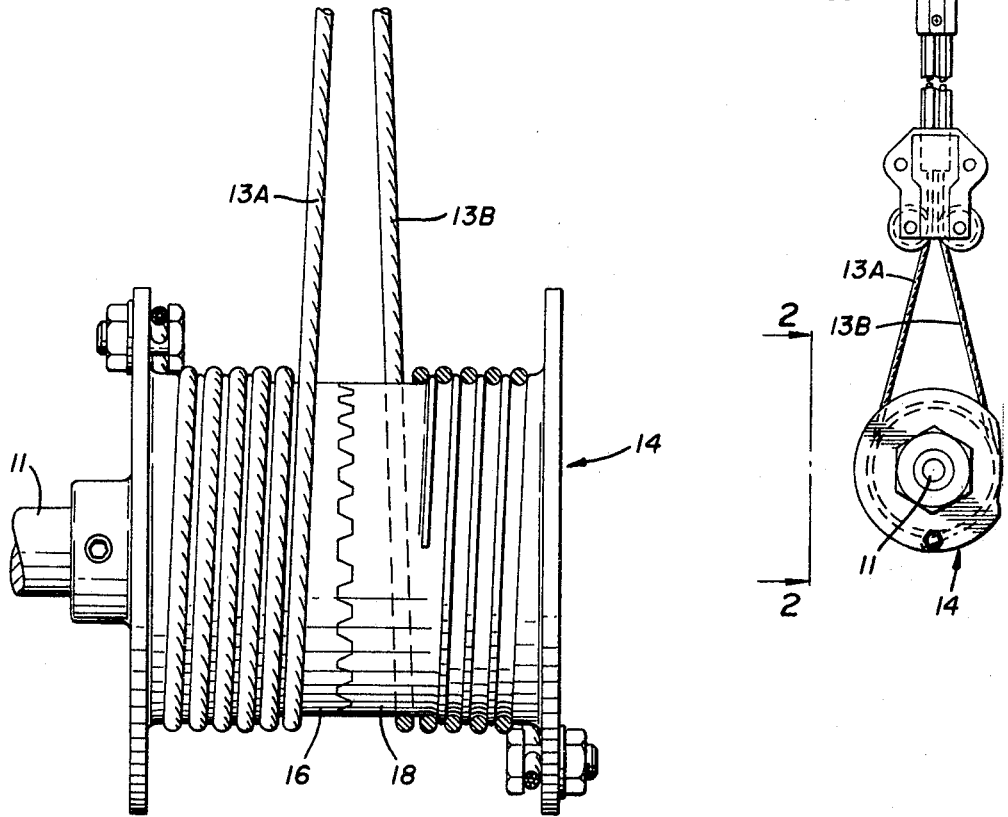
FIG. 2 is an enlarged plan view of an adjusting drum exemplary of the type usable in a balanced system for transmitting motion taken substantially on line 2—2 of FIG. 1.

Referring more particularly to the drawings, a balanced system for transferring motion embodying the concept of the present invention is indicated geneally by the numeral 10. Typifying a balanced system, a control, or driving, shaft 11 is connected to the system 10 to transfer the motion of the driving shaft 11 to a remote driven shaft 12. Two strands 13A and 13B of a cable 13 extend through the system 10 between the two shafts 11 and 12. While the art knows any number of ways to connect the strands 13A and 13B to the two shafts, a pair of drums 14 and 15, one mounted on each shaft, is most advantageous.

Drum 14 connected to driving shaft 11 may be of the adjusting type with strand 13A secured to the capstan section 16 thereof and strand 13B secured to the floating section 18 thereof so that rotation of the shaft 11 in one direction applies tension to strand 13A and rotation of the shaft 11 in the opposite direction applies tension to strand 13B. The details of the drum 14 form no part of the present invention and may be obtained from my copending U.S. application, Ser. No. 677,825 filed Sept. 29, 1967, now U.S. Patent No. 3,403,578.

The drum 15 is attached to a driven shaft 12 and has several turns of strand 13A wrapped thereabout in one direction and several turns of strand 13B wrapped thereabout in the opposite direction so that selective rotation of the driving shaft 11 imparts a correspondingly selective rotation of the driven shaft 12. The strands 13A and 13B may be attached to the drum 15 in any number of ways—the strands may be clamped to the drum or a bight 19 in cable 15 may pass through the drum itself, as described in the aforesaid U.S. Patent No. 3,803,578 and as shown in FIG. 1 hereof.

The pair of strands 13A and 13B outwardly of the drums 14 and 15 enter the improved conduit 20 through a terminal block 21. The terminal block 21 has opposed rollers, or pulleys, 22 and 23 which guide the strands 13A and 13B into the conduit 20 without damaging abrasion or other excessive contact. Bracket ears 24 may be provided, as desired, for mounting the terminal block 21 in the desired location.

The unique conduits 20 have a pair of opposed cable receiving ducts 25 and 26 separated by a web section 28. As best shown in FIG. 3, the cross-section of each duct section has the general shape of a truncated sector—the divergence from the shape of a true truncated sector lying in the fact that the side walls 29 and 30 are not truly radial but rather, while being convergent radially inwardly of arcuate wall 31, converge less rapidly than would walls truly radial of the center 33 about which the arcuate wall 31 included between the side walls 29 and 30 is curved. The side walls 29 and 30, if extended, converge inwardly beyond the center about which the arcuate wall 31 curves. The chord wall 32 for each duct truncates the sector-like cross-section thereof radially outwardly of the center 33 of arcuate wall 31, the center 33 being coincident with the longitudinal axis of the conduit 20. The cross-sectional shape of the chamber 34 within each duct conforms with the cross-sectional profile of the duct not only to permit a change in the plane of the cables passing therethrough with minimal frictional resistance by torsionally twisting the conduit but also to accommodate relative rotational displacement between the elbow and the conduit, also with minimal frictional resistance.

The web 28 extends between the chord walls 32 of the symmetrically opposed duct sections 25 and 26 and separates then sufficiently to receive the securing means for the coupler 35, as more fully hereinafter described in conjunction with FIGS. 4 and 5.

As so described, the two ducts 25 and 26 are joined into a unitary construction having excellent beam, columnar and torsional strength. To reduce the torsional strength, and yet maintain the desired high beam and columnar strength, the arcuate wall 31 of each duct section is made discontinuous by a longitudinal cleft 36 along the apogee of wall 31 with respect to the chord wall 32. The cleft 36 does not appreciably reduce the beam and columnar strength of the conduit 20 yet it permits the conduit to be twisted about its longitudinal axis 33 without deformation of the chamber 34 within each duct portion 25 and 26 even though this twisting, or torsional, stress necessarily exceeds the elastic limit of the conduit material for the conduit to retain the twist after the torsional stress is removed.

When a structure is subjected to a twisting force that structure is said to be subjected to torsion, and the stresses developed by torsion are shearing stresses. Therefore, by using a material such as aluminum which has a modulus of elasticity in tension or compression on the order of 10,000,000 pounds per square inch but only about 3,700,000 pounds per square inch in shear, a lightweight conduit with good columnar and beam strength may be provided but yet is easily twisted to impart a permanent set for changing the plane of the cables within the conduit, and is even more fully hereinafter described in conjunction with FIGS. 10–12.

Sections 20A and 20B of the subject conduit 20 can be readily connected into longer lengths by the use of a coupler 35. As best shown in FIGS. 4 and 5, the connector 35 comprises a sleeve 41 having opposed arcuate walls 42 and 43 which will slide concentrically over and engage the arcuate walls 31 of the opposed duct sections 25 and 26 of the conduit 20.

Parallel, spaced, flank walls 44 and 45 extend generally transversely of the arcuate walls 42 and 43 and are oriented somewhat inwardly of the longitudinal edges of the opposed arcuate walls 42 and 43. The edges of the transverse flank walls 44 and 45 are connected to the adjacent edges of the arcuate walls 42 and 43 by longitudinally extending flared bridge walls 48, 49, 50 and 51, respectively. These bridge walls are positioned generally to overlie the corresponding side walls 29 and 30 of the respective cable receiving ducts 25 and 26 and yet diverge therefrom. For example, as best seen in FIG. 5, the bridge wall 48 joins the arcuate wall 42 directly over the intersection of the side wall 29 with the arcuate wall 31 of duct 25. The bridge wall 49 is similarly located with respect to the side wall 30 of duct 25. Because the bridge walls 48 and 49 converge from the arcuate wall 42 of the coupler 35 to an even lesser extent than the side walls 29 and 30 converge from the arcuate wall 31 of the conduit 20, the bridge walls diverge from the side walls as they extend inwardly. This divergence, or flaring, of the bridge walls 48, 49, 50 and 51 with respect to the side walls of conduit 20 contributes to the provision of a firm frictional engagement between the coupler 35 and the sections 20A and 20B of the conduit received therein as the coupler 35 is tightened into position.

As best shown in FIG. 4, the two sections 20A and 20B abut, at point 52 within the coupler 35 and a pair of screws 53 and 54 are insertable to engage the coupler, one through each section of conduit 20A and 20B. Referring more particularly to FIG. 5, the shaft 57 of screw 54 is preferably of such diameter that it pierces only the web 28 of the conduit section 20B without entering either chamber 34 and without weakening the chord wall 32. In this position the screw 54 lies normal to the opposed flank walls 44 and 45 of coupler 35 and passes through the registered bores 55 and 56 in the respective flank walls. For convenience of assembly the bores 55 and 56 in coupler 35 and the aligned piercing bore 58 through the web 28 may be predrilled at the factory.

Further to enhance the convenience of assembly, a pair of longitudinal ridges 59 and 60 extend along each flank wall 44 and 45 of the coupler 35. These ridges 59 and 60 are spaced outwardly of the screw receiving bores 55 and 56 through the flank walls and engage the opposed flats 61 and 62 on a hexagonal nut 63 to keep it from rotating while the screw 54 is being tightened. By providing ridges on both sides of the coupler, assembly is even further facilitated since it can be accomplished from either side. With ridges on both sides of the coupler 35, however, a wrench could not conveniently clear the ridges and the head 64 of each screw is accordingly recessed or otherwise slotted, as at 65, so that assembly can be accomplished by a screw driver.

As the screws 53 and 54 are turned into their respective nuts, the pressure which results between the nut 63 and head 64 tends to force the parallel, spaced, flank walls 44 and 45 of the coupler 35 toward each other. The flare of the bridge walls 48, 49, 50 and 51 permits the flank walls 44 and 45 actually to move toward each other and thereby forces the arcuate walls 42 and 43 of the coupler 35 firmly against the corresponding arcuate walls 31 and the conduit 20. Thus, with just one screw passing through each section of the conduit, the two sections are clamped rigidly together so that absolute registry is obtained between the corresponding chambers 34 of the sections joined by coupler 35.

Figure 6:
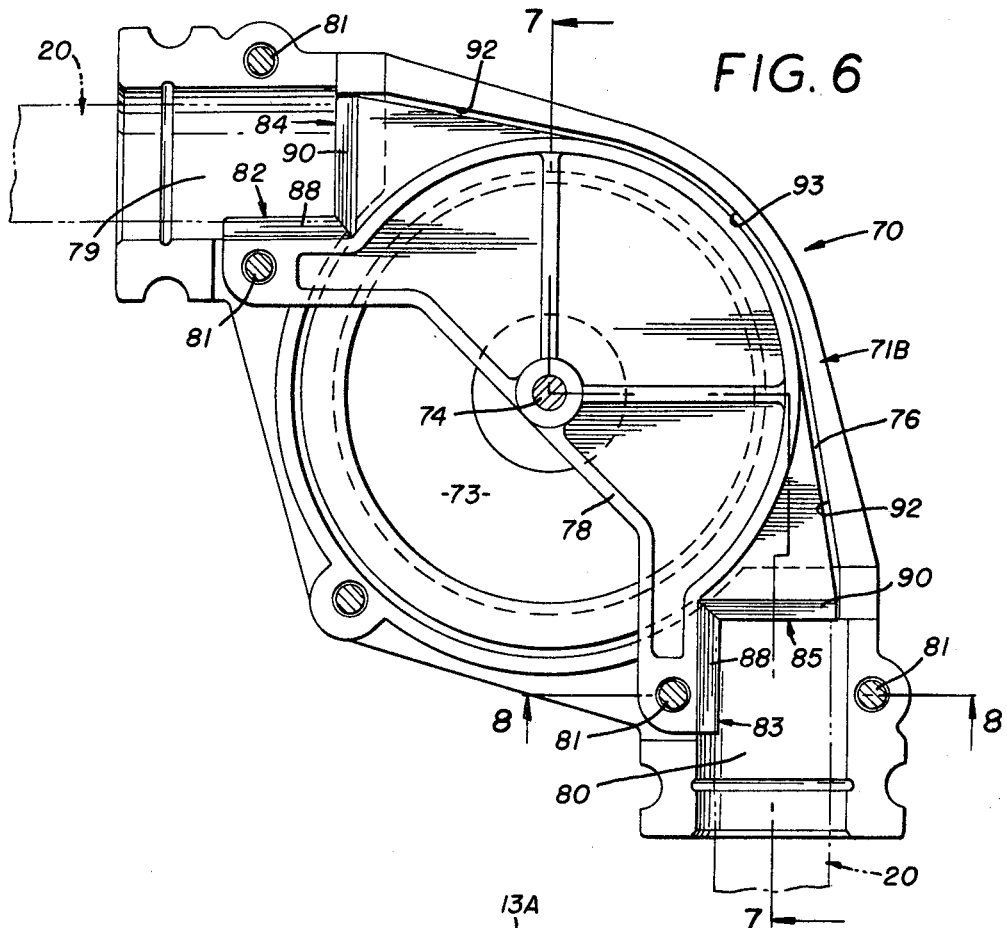
FIG. 6 is an enlarged longitudinal section through the 90° elbow depicted in FIG. 1 which shows the unique key plate in side elevation.

Although a change in the orientation of the cables 13A and 13B about the longitudinal axis 33 of conduit 20 can be affected by torsionally twisting the conduit to the desired position, a change in direction that diverges from the axis 33 of the conduit requires an elbow. Elbows are preferably made in standard bends—e.g., for 45° and 90° changes in direction—but can be made for any selected degree of bend. Elbow 70 depicted in FIGS. 1, 6 and 7 represents a typical 90° bend. The elbow 70 has a housing 71 which may be formed in symmetrical opposing sections 71A and 71B. A pair of pulleys 72 and 73 are coaxially mounted for rotation on a shaft 74 extending between the side walls 75 and 76 of the respective housing sections 71A and 71B. The pulleys 72 and 73 are mounted in spaced relation to each other by the interpositioning of a key plate 78 therebetween.

Disposed in the selected angularity with respect to each other in the housing 71 are a pair of sockets 79 and 80. These sockets are cylindrical and of such diameter that when the opposed sections 71A and 71B of the elbow are tightly bolted together they firmly engage the opposed arcuate walls 31 of the conduit received therein. As shown in FIG. 6, a boss is provided in the housing sections on each side of each socket 79 and 80 and is bored to receive a bolt 81 by which the sections may be secured together. In fact, the shaft 74 may also be a bolt to facilitate assembly of the elbow 70.

The key plate 78 not only axially separates the two rotatably mounted pulleys 72 and 73 but also carries a pair of index keys 82 and 83. Index key 82 extends longitudinally along and radially into the cylindrical socket 79 and limits the extent of rotational displacement between the elbow 70 and the conduit 20 received in socket 79. Similarly, the index key 83 on the opposite side of the key plate 78 extends longitudinally along and into the socket 80.

Figure 8:
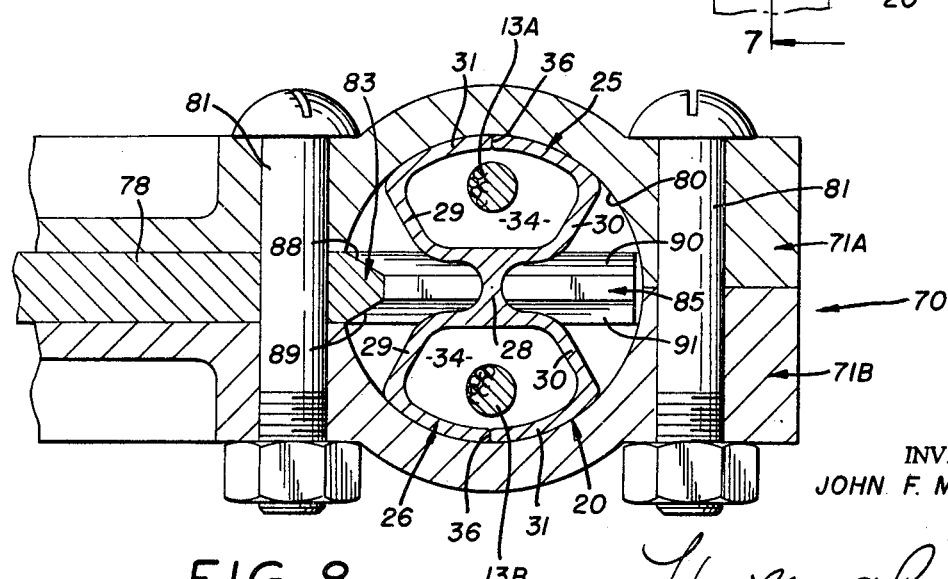
FIG. 8 is a further enlarged cross-section taken substantially on line 8—8 of FIG. 6.

The index keys 82 and 83 are preferably beveled to provide stop surfaces 88 and 89 against which the side walls 29 or 30 of the ducts 25 and 26 in conduit 20 may abut. As shown in FIG. 8, the conduit 20 may lie transversely within socket 80. However, as shown in FIG. 9, the conduit may as well be rotated from the position shown in FIG. 8 approximately 30° until the side wall 29 abuts the beveled stop surface 88 on index key 83. A similar rotational displacement is also available in the opposite direction.

A guide flange 84 extends transversely from the index key 82 diametrically of the socket 79. A similar guide flange 85 extends transversely from the index key 83 diametrically of the socket 80.

As is best shown in FIG. 9, the guide flange 85 is beveled to present deflecting surfaces 90 and 91 which continue from the beveled stop surfaces 88 and 89 of index key 83. The guide flange 84 is also so beveled. The beveled deflecting surface 90 assures that when the control cable 13A is threaded from the chamber 34 in duct 25 into the elbow 70 it will only reeve about the pulley 72 and will not inadvertently be reeved about pulley 73. At the same time, the beveled deflecting surface 91 assures that when the control cable strand 13B is threaded from the chamber 34 in duct 26 into elbow 70 it will only reeve about pulley 73.

As shown in FIG. 6, the guide flanges 84 and 85 preferably extend from the respective conduit receiving sockets 79 and 80 along the inner wall 92 that extends tangentially of the curved inner wall 93 lying in concentric juxtaposition around a portion of the periphery of the pulleys 72 and 73 to the respective sockets. This assures that as the cable is threaded from the pulley toward the conduit received in one of the sockets 79 or 80 the cable cannot enter thte chamber 34 in the wrong duct 25 or 26.

The curved inner wall 92 and, if desired, a portion of the inner wall 92 may be formed on a removable access plate fitted in the elbow 70 or, as shown, be formed on the opposed sections 71A and 71B of the housing 71.

The unique components for the improved system heretofore described can be assembled with all lengths of conduit 20 extending untwisted through the pathway required with the elbows attached to the conduit within the range of rotational displacement described in conjunction with FIGS. 8 and 9, at each location where a bend is desired. Additionally, the length of conduit may be torsionally twisted to effect an additional change in orientation.

For example, as best shown in FIG. 10, when it is desired to change the plane of travel of the cables 13A and 13B as they pass through two, closely coupled elbows, this can be accomplished by combining the change of plane ability achieved not only by torsionally twisting the conduit itself but also by rotationally displacing the elbows with respect to the conduit passing therebetween. The elbow 170 is attached to the conduit 120 at approximately its full rotational displacement in one direction— i.e., in the manner represented in FIG. 11. As shown in FIG. 11, the conduit 120 is securely clamped within socket 180 between the two opposed sections 171A and 171B of housing 171 with the side wall 130 of duct 126 abutting the stop surface 188 on index flange 183. This accomplishes a 30° change in plane as well as a 90° change in direction.

The conduit 120 is itself torsionally twisted about the longitudinal axis 133 to accomplish an additional 30° change in plane. Such a twist is easily affected through the span of a 3″ bulkhead by a conduit 120 having a dimension of 1⅛″ from the cleft 136 in the wall 131 of duct 125 to the cleft 136 in the wall 131 of duct 126.

The elbow 270 is attached to the opposite end of duct 120 at approximately its full degree of rotational displacement. As shown in FIG. 12, the conduit 120 is securely clamped within socket 280 between the two opposed sections 271A and 271B of housing 271 with the side wall 130 of duct 125 abutting the stop surface 289 on index flange 283. This provides an additional 30° change in plane. Thus, the total change of plane of the strands 113A and 113B amounts to 90° through two 90° elbows 170 and 270 and a short section of the improved conduit 120.

A close study of FIGS. 10–12 will also reveal that this change of plane is accomplished without contact of the strands 113A and 113B with any structure other than the pulleys within the elbows 170 and 270. The strands 113A and 113B enter elbow 170 through a conduit 120′ which is oriented in the transverse position with respect to elbow 170—i.e., in that orientation depicted in FIG. 8. As the strands 113A and 113B leave elbow 170 and enter conduit 120 (FIG. 11) it will be noted that although the relative rotational displacement of the conduit 120 with respect to elbow 170 is at its maximum, the cable strand 113A enters chamber 134 in duct 125 in proximity to but not engaging the side wall 130 theerof. Similarly, the cable strand 113B enters chamber 134 of duct 126 in proximity to but not engaging the side wall 129 thereof.

In the same manner, even though the elbow 270 is attached at the maximum rotational displacement with respect to the conduit 120, the strand 113A will have closely approached, but not contacted, the opposite side wall 129 of duct 125 and strand 113B will have closely approached, but not contacted, the side wall 130 of duct 126 as the strands 113A and 113B leave conduit 120 and enter 270. As these strands leave elbow 270 and enter conduit 120″, which may also be oriented in the transverse position (FIG. 10), they are again centered within the appropriate chambers 134 without the possibility of crossover or other deleterious frictional engagement with the conduit or elbows.

It may also be desired to incorporate one or more tributary connections into a system embodying the concept of the present invention. That is, one may wish to include more than one remote driving station and/or more than one remote driven station. A lateral take-off is provided for this purpose. As shown in FIG. 13, there may be two remote driving stations, represented by shafts 311A and 311B, on each of which is mounted a driving drum 314.

The strands 313A and 313B are wrapped in opposition about the drum 314A on shaft 311A and may enter conduit 3200A through a terminal block 321A. The conduit 320A is twisted about its longitudinal axis to connect to a 90° elbow 370A. The cable strands 313A and 313B extend from the conduit 320A, around the pulleys of the 90° elbow 370A and into the conduit 320B which is twisted about its longitudinal axis to connect to a lateral take-off 390.

The strand 313A departs laterally from the run of strand 313B which extends straight through take-off 390. In its departing lateral run 313A' the strand passes through one chamber in conduit 320C and out terminal block 321B to the second driving drum 314B on shaft 311B. The strand 313A is wrapped the requisite number of turns about drum 314B and returns, 313A″, through terminal block 321B into the second chamber in conduit 320C and back to the take-off 390 which redirects the strand 313A, with strand 313B, into and through conduit 320D. The lateral take-off 390, in conjunction with conduit of the subject construction, thus allows tributary connections into the system.

From conduit 320D the cable may be routed, as desired, to include any number of tributary connections either to driving or driven stations and finally ends with the strands 313A and 313B wrapped about the most remote drum 315 on shaft 312.

The lateral take-off 390, as best seen in FIGS. 14 and 15, has a housing 391 which may be formed in symmetrical, opposing sections 391A and 391B. A pair of pulleys 392 and 393 are rotatably mounted on two spaced, parallel shafts 394 and 395 to lie in substantially the same plane. A pair of through sockets 396 and 397 are aligned with each other and oriented generally tangentially to the two pulleys 392 and 393. An additional, lateral, socket 398 is oriented transversely of the two aligned sockets 396 and 397 and generally tangentially with respect to the adjacent portions of the two pulleys 392 and 393. All three sockets 396, 397 and 398 are cylindrical and of such diameter that when the opposed housing sections 391A and 391B are tightly bolted together they firmly engage the opposed arcuate walls 331 of the conduits 320B, 320C and 320D received therein. As shown in FIG. 13, a plurality of bosses are provided, including those on each side of the sockets, to receive a bolt 399 by which the sections may be secured together. In fact, the shafts 394 and 395 may also be bolts to assist in the facile assembly of the lateral take-off 390.

An index key 400 extends longitudinally along and radially into each of the cylindrical sockets 396, 397 and 398 to limit the extent of rotational displacement available between the lateral take-off 390 and the conduits 320B, 320C and 320D received in each socket 396, 398 and 397, respectively. The index keys 400 are preferably beveled to provide stop surfaces 401 and 402 against which the side walls 329 and 330 of ducts 325 and 326 may abut.

A guide flange 403 extends transversely from each index key 400 diametrically across the inner extent of each socket. As shown in FIG. 15 the guide flanges may be formed with opposing halves extending from each housing section 391A and 391B. The guide flanges 403 are also beveled to present deflecting surfaces 404 and 405 similar to the beveled stop surfaces 401 and 402 of the index keys 399. These deflecting surfaces 404 and 405 assure that when the control cable extends from either chamber 334 of any of the conduits secured to the lateral take-off 390 it will pass into the lateral take-off 390 in the proper orientation with respect to the pulleys 392 and 393.

The axial extent of the guide flanges 403 is not critical, but it has been found desirable to extend them at least to the quadrant points 406 and 407 on pulley 392 and the quadrant points 408 and 409 on pulley 393 so that one who has removed the access plate 410 secured between the opposed sections 391A and 391B of the lateral take-off 390 can readily observe the proper disposition of the cables entering and leaving the lateral take-off 390.

Referring again to FIG. 13, the conduit 320D is twisted about its longitudinal axis to connect to an elbow 370B from which the cable strands 313A and 313B emerge to wrap appropriately about drum 315. As best shown in FIG. 16, an annular wear ring 411 is fitted within the exiting socket 380 of elbow 370B. Ring 411 is preferably a self-lubricating plastic material which protects the cable strands from frictionally wearing against the sides of socket 380 and constitutes an inexpensive means for exiting from an elbow, or a lateral take-off, without the necessity of an additional length of conduit and a terminal block.

The annular wear ring 411 has a stop flange 412 which extends radially outwardly of the sleevelike body 413 and engages the axial face 414 of the socket 380. A plurality of lips 415 extend radially of the resilient tabs 416 aligned axially with the body 413. The resilient tabs 416 bias the lips 415 radially outwardly for a snap fit into the annular groove 417 provided on the cylindrical interior wall of the socket 380.

From the foregoing description of this unique system one can readily appreciate the ease with which cable separation is maintained. To further enhance the facility of this system, it has also been found desirable to code the conduit. For example, as shown in FIG. 13, the arcuate outer wall 313 of the duct 325 may be marked with striae 418. With only one duct so striated one may by visual, or tactile, sense thread and rethread even the most complex installation of the subject system merely by running one cable strand through the striated duct. The second strand is then run through the other duct without any possibility of crossover or other mistake.

It should now be apparent that a system constructed according to the present invention prevents cable crossover, simplifies threading the control cables therethrough and otherwise accomplishes the objects of the invention.

I claim:

1. In a system for transmitting motion by balanced cables, a conduit, said conduit comprising opposed, parallel ducts, said opposed ducts being rigidly joined, each said duct having an outer wall bounding a longitudinal chamber within that duct, a longitudinal cleft through the outer wall of each duct.

2. A conduit for the system, as set forth in claim 1, in which the outer wall of each duct is arcuate and in which the opposed ducts are laterally separated and rigidly joined by a web section.

3. In a system for transmitting motion by balanced cables, at least one conduit and a coupler, said conduit comprising opposed, laterally separated, parallel ducts, said opposed ducts being rigidly joined by a web section, each said duct having an arcuate outer wall bounding a longitudinal chamber within that duct, a longitudinal cleft through the outer wall of each said duct, said coupler adapted to join lengths of conduit in longitudinally abutting relation and comprising opposed arcuate walls matingly embraceable with the corresponding arcuate outer walls of the said ducts, said coupler also having opposed transverse side walls, and fastening means extendable through said side walls and the web sections of the conduit received therein.

4. In a system for transmitting motion by balanced cables, at least one conduit and an elbow, said conduit comprising opposed, laterally separated, parallel ducts, said opposed ducts being rigidly joined by a web section, each said duct having an arcuate outer wall bounding a longitudinal chamber within that duct, a longitudinal cleft through the outer wall of each said duct, said elbow comprising a pair of adjacent pulley means coaxially journaled therein, a pair of cylindrical sockets for receiving at least one said conduit extending toward said elbow, means for securing said conduit into a socket, index means extending into said socket for restricting the rotational displacement of the conduit received in said socket with respect to said elbow.

5. A system as set forth in claim 4, in which guide flanges extend tangentially from between said coaxial pulleys, one to each said socket, each said guide flange extending diametrically of its respective socket.

6. A system as set forth in claim 5, in which the cylindrical sockets receive first and second conduits extending toward said elbow at a preselected angle with respect to each other, and in which an index plate is mounted between said pulley means, said index means and guide flanges carried on said plate, said index means and guide flanges cooperative to maintain the balanced cables separate through said elbow from the appropriate chamber in the first of the conduit secured thereto to the corresponding chamber in the second of the conduits secured thereto.

7. In a system for transmitting motion by balanced cables, a conduit and a lateral take-off, said conduit comprising opposed, laterally separated, parallel ducts, said opposed ducts being rigidly joined by a web section, each said duct having an arcuate outer wall bounding a longitudinal chamber within that duct, a longitudinal cleft through the outer wall of each said duct, said lateral take-off comprising a pair of adjacent pulley means journaled in substantially the same plane on parallel, spaced shaft means, a pair of axially aligned through sockets oriented tangentially of said adjacent pulley means, a lateral socket oriented transversely of said through sockets and generally tangentially with respect to the adjacent portions of said pair of pulley means, and means for securing said conduit into at least one of said sockets.

8. A system as set forth in claim 7, in which index means extend at least into those sockets in which conduit is secured, said index means restricting the rotational displacement of the conduit received in said sockets with respect to said lateral take-off.

9. A system as set forth in claim 8, in which a guide flange extends transversely of said index means diametrically across the inner extent of each said socket.

10. A system as set forth in claim 2, in which each duct has a chord wall spaced inwardly of said arcuate outer wall with a pair of side walls extending between said arcuate outer and inner chord walls such that the cross sectional profile of each duct is generally that of a truncated sector with said web section extending transversely between the opposed, spaced chord walls of the said ducts.

11. In a system as set forth in claim 3, in which each duct of the conduit has a chord wall spaced inwardly of said arcuate wall with a pair of side walls extending between said arcuate outer and inner chord walls such that the cross sectional profile of each duct is generally that of a truncated sector with said web section extending transversely between the opposed, spaced chord walls of said ducts, and in which said coupler has opposed, substantially parallel flank walls extending generally transversely of said arcuate walls, flaring bridge walls joining said arcuate walls to said side walls and fastening means extendable through said flank walls and the web section of said conduit.

12. A system as set forth in claim 11, in which said bridge walls generally overlie the side walls of said ducts and are flared at a greater angular inclination than said side walls to diverge therefrom so that as the fastening means are tightened to draw the said flank walls toward each other the arcuate walls of said coupler are brought into firm embracing engagement with the arcuate outer walls of the opposed ducts.

13. A system as set forth in claim 12, in which a pair of spaced ridges extend outwardly, longitudinally along at least one of said flank walls to embrace the opposed flats of a nut on said fastening means.

14. A system as set forth in claim 13, in which the spaced ridges extend outwardly longitudinally along both said flank walls and said fastening means is a screw with a recessed head, at least one screw passing through the web section of each conduit joined by said coupler.

15. In a system as set forth in claim 4, in which each duct of the conduit has a chord wall spaced inwardly of said arcuate wall with a pair of side walls extending between said arcuate outer and inner chord walls such that the cross sectional profile of each duct is generally that of a truncated sector with said web section extending transversely between the opposed, spaced chord walls of said ducts, and in which said index means comprises a key in each said socket for selective engagement with the side walls of the ducts of said conduit to limit the rotational displacement of the elbow with respect to each said conduit.

16. A system as set forth in claim 15, in which the index keys are carried on a key plate which is interpositioned between a pair of pulley means coaxially journaled for rotation within said elbow, said key plate also presenting a pair of guide flanges which extend generally tangentially from between said pulley means, one to each said socket across the inner extent of which it extends diametrically to maintain the balanced cables separate through said elbow from the appropriate chamber in one of the conduits secured thereto to the corresponding chamber in the second of the conduits secured thereto.

17. A system as set forth in claim 16, in which the index key and guide flange at each socket extend transversely of each other and are both beveled, the opposed bevels on said index keys presenting stop surfaces against which the side walls of the ducts on the conduit received in said socket may abut, the opposed bevels on each said guide flange presenting deflecting surfaces against which the cables in the opposed ducts may move to assure continuance of the cables in their appropriate chambers.

18. A system as set forth in claim 10, in which the longitudinal cleft occurs at the apogee of the arcuate outer wall of each duct with respect to the chord wall of that duct.

19. A system as set forth in claim 10, in which the side walls of each said duct converge inwardly from the arcuate outer wall less rapidly than corresponding radii of the arc along which said outer wall is curved.

20. A system as set forth in claim 19, in which at least one said duct is coded along the exterior thereof.

21. In a system for transmitting motion by balanced cables, a plurality of conduits, at least one coupler, at least one elbow and at least one lateral take-off, said conduit comprising opposed, laterally separated, parallel ducts, said opposed ducts being rigidly joined by a web section, each said duct having an outer wall bounding a longitudinal chamber in that duct, a longitudinal cleft through the outer wall of each duct, said coupler adapted to joint lengths of said conduit in longitudinally abutting relation, said coupler comprising opposed walls matingly embraceable with the corresponding outer walls of said ducts, opposed, transverse side walls and fastening means extensible through said side walls and the web sections of the conduit received therein, said elbow comprising a pair of adjacent pulley means coaxially journaled therein and a pair of cylindrical sockets for receiving at least one conduit extending toward said elbow, means for securing said conduit into a socket, and said lateral take-off comprising, a pair of adjacent pulley means secured in substantially the same plane on parallel, spaced shaft means, a pair of axially aligned through sockets oriented tangentially of said adjacent pulley means, a lateral socket oriented transversely of said through sockets and generally tangentially with respect to the adjacent portions of said pair of pulley means, and means for securing said conduit into at least one of said sockets.

References Cited

UNITED STATES PATENTS

| 637,457 | 11/1899 | Greenfield | 74—501 X |
| 1,071,411 | 8/1913 | Giclas | 138—168 X |
| 1,087,172 | 2/1914 | McCombe | 138—178 X |
| 1,154,955 | 9/1915 | Wills | 138—156 |
| 1,427,829 | 9/1922 | Luckey | 74—501 |
| 1,935,806 | 11/1933 | Mautsch | 74—501 X |
| 2,381,367 | 8/1945 | Quayle | 138—156 X |

FOREIGN PATENTS 469,399 5/1914 France.

FRED C. MATTERN, Jr., Primary Examiner

U.S. Cl. X.R.

138—154, 156

PO-1050
(5/69)

UNITED STATES PATENT OFFICE
CERTIFICATE OF CORRECTION

Patent No. 3,503,275          Dated March 31, 1970

Inventor(s) JOHN F. MORSE

It is certified that error appears in the above-identified patent and that said Letters Patent are hereby corrected as shown below:

Col. 3, line 6, after "transverse" insert a comma (,).

" 4, " 40, change "3,803,578" to -- 3,403,578 --.

" 4, " 75, change "then" to -- them --.

" 8, " 16, after "enter" insert -- elbow --.

" 8, " 34, change "3200A" to -- 320A --.

" 9, " 38, change "appropirately" to -- appropriately --.

" 12, " 26, change "joint" to -- join --.

SIGNED AND
SEALED
SEP 15 1970

(SEAL)
Attest:

Edward M. Fletcher, Jr.
Attesting Officer

WILLIAM E. SCHUYLER, JR.
Commissioner of Patents